M. G. Cunningham,

Hay Press.

No. 110,442.  Patented Dec. 27, 1870.

Witnesses.  Inventor.
Gustave Dieterich.  M. G. Cunningham
D. S. McFaber.  per.
  Attorneys.

United States Patent Office.

MATTHEW G. CUNNINGHAM, OF CORSICANA, TEXAS.

Letters Patent No. 110,442, dated December 27, 1870.

IMPROVEMENT IN PRESSES FOR HAY, COTTON, &c.

The Schedule referred to in these Letters Patent and making part of the same.

*To all whom it may concern:*

Be it known that I, MATTHEW G. CUNNINGHAM, of Corsicana, in the county of Navarro and State of Texas, have invented a new and useful Improvement in Presses; and I do hereby declare that the following is a full, clear, and exact description thereof, which will enable others skilled in the art to make and use the same, reference being had to the accompanying drawing forming part of this specification.

This invention relates to improvements in presses for hay, cotton, and other like substances, and consists in an improved arrangement of means for working the follower by means of a screw.

Figure 1:
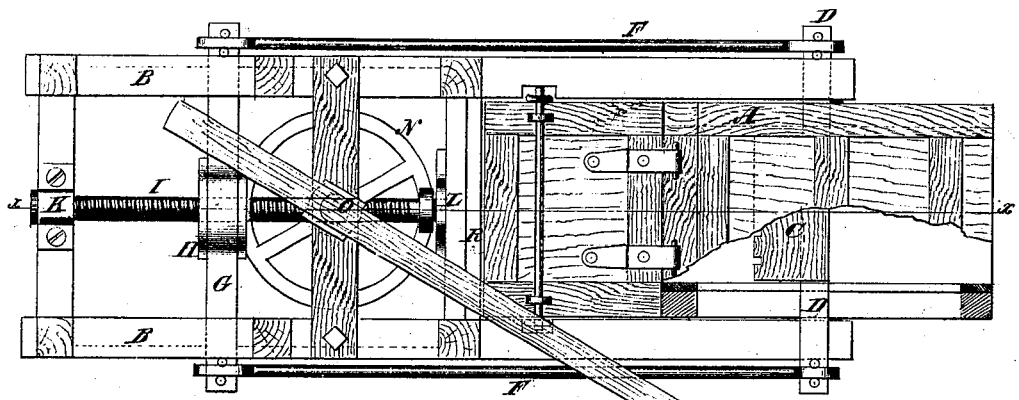
Figure 2:
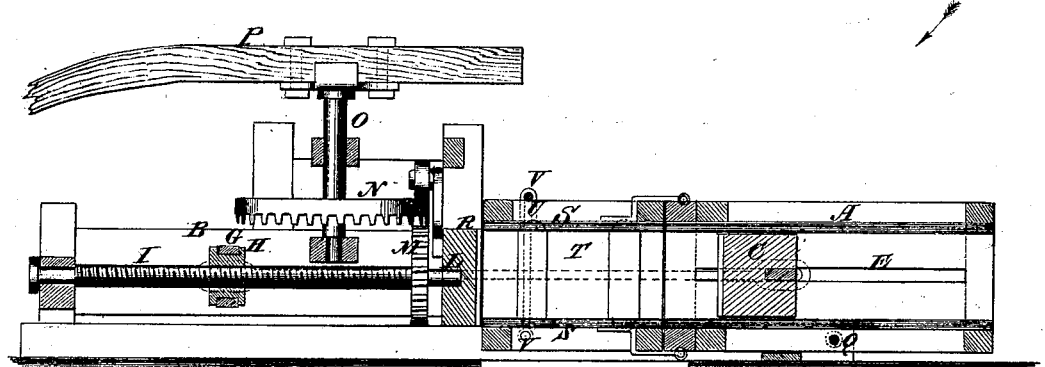

Figure 1 is a plan view of my improved press, a part of the case being broken out; and Figure 2 is a section of the same on the line $x\ x$ of fig. 1.

Similar letters of reference indicate corresponding parts.

A represents the pressing-case, and B a frame attached thereto, both arranged to be laid on the ground, or on a suitable bed-frame, for operation.

C is the follower, which is provided with a bar, D, which projects at both ends through the case, which is provided with long slots, E, for the purpose.

This bar is connected, by rods F, one on each side of the case, with the cross-head G, arranged to slide back and forth in the frame A, and having a nut, H, through which the screw I works.

This screw is arranged in bearings at K L, which are specially designed to prevent end movement.

M is a gear-wheel attached to the screw, and gearing with a master-wheel, N, on the vertical shaft O, arranged in the frame B above the screw, and having a sweep, P, attached to the top of it, the said sweep being so arranged that the animal attached to it may travel around the case and frame. The case is arranged on trunnions at Q, to be turned up for filling when the follower is moved back to the outer end of the case.

When it is filled, the front end turns down and bears against the strong beam or head R, which takes most of the end thrust of the screw, so that the end pressure of each is neutralized by the other and the frame suffers but little strain in the pressing operation.

The upper part of the case is provided with the doors S, to be opened for removing the bale. They are clamped against the sides T of the case by the yokes U and the rods V.

This arrangement provides a very simple and efficient press, which may be constructed of light material, and it may be operated in the field or any place where it may be required, and is easy of transportation from place to place.

Having thus described my invention,

I claim as new and desire to secure by Letters Patent—

The combination and arrangement of the case A, frame B, follower C, rods F, cross-head G, screw I, nut H, wheels M and N, and the sweep, all substantially as specified.

MATTHEW G. CUNNINGHAM.

Witnesses:
J. Y. BATES,
J. W. STEWART.